United States Patent
Yoon et al.

(10) Patent No.: US 8,930,546 B2
(45) Date of Patent: Jan. 6, 2015

(54) PEER-TO-PEER CONNECTION SYSTEM AND METHOD FOR USE IN MULTI-NETWORK ENVIRONMENT

(75) Inventors: Hee Tae Yoon, Seoul (KR); Young Kwang Kim, Namyangju-si (KR)

(73) Assignee: Samsung SDS Co., Ltd., Seoul (KR)

( * ) Notice: Subject to any disclaimer, the term of this patent is extended or adjusted under 35 U.S.C. 154(b) by 0 days.

(21) Appl. No.: 13/307,737

(22) Filed: Nov. 30, 2011

(65) Prior Publication Data

US 2012/0137011 A1   May 31, 2012

(30) Foreign Application Priority Data

Nov. 30, 2010 (KR) .................. 10-2010-0120691

(51) Int. Cl.
- G06F 15/16 (2006.01)
- H04L 29/08 (2006.01)
- H04L 29/12 (2006.01)
- H04L 29/06 (2006.01)

(52) U.S. Cl.
CPC ........ H04L 67/104 (2013.01); H04L 29/12528 (2013.01); H04L 29/12952 (2013.01); H04L 61/2575 (2013.01); H04L 61/6077 (2013.01); H04L 69/14 (2013.01)
USPC .......................................... 709/227; 709/228

(58) Field of Classification Search
USPC .......................................... 709/227, 228, 230
See application file for complete search history.

(56) References Cited

U.S. PATENT DOCUMENTS

| | | | |
|---|---|---|---|
| 2007/0189311 A1* | 8/2007 | Kim et al. | 370/401 |
| 2007/0268858 A1* | 11/2007 | Soto | 370/328 |
| 2008/0259943 A1* | 10/2008 | Miyajima et al. | 370/401 |
| 2009/0006538 A1* | 1/2009 | Risney et al. | 709/203 |
| 2011/0149871 A1 | 6/2011 | Liu et al. | |
| 2011/0283151 A1 | 11/2011 | Kaneko | |
| 2011/0286471 A1* | 11/2011 | Capone et al. | 370/469 |

FOREIGN PATENT DOCUMENTS

| | | |
|---|---|---|
| CN | 101057460 A | 10/2007 |
| CN | 101340722 A | 1/2009 |
| KR | 10-2010-0070691 A | 6/2010 |

OTHER PUBLICATIONS

Rosenberg, J. et. al. "SIP: Session Initiation Protocol" Jun. 1, 2002, pp. 1-269.

Extended European Search Report issued on Mar. 5, 2012 by the European Patent Office in the counterpart European Patent Application No. 11191324.0.

Communication dated Jul. 29, 2014 from the State Intellectual Property Office of P.R. China in a counterpart application No. 201110389372.4.

* cited by examiner

*Primary Examiner* — Brian J Gillis
(74) *Attorney, Agent, or Firm* — Sughrue Mion, PLLC

(57) ABSTRACT

Provided are a peer-to-peer (P2P) connection system and method for use in a multi-network environment. The P2P connection system includes a user terminal configured to register connection information for connecting to the user terminal through each of a plurality of connectable networks in a location server; and the location server configured to store the connection information received from the user terminal.

7 Claims, 3 Drawing Sheets

PEER-TO-PEER CONNECTION SYSTEM AND METHOD FOR USE IN MULTI-NETWORK ENVIRONMENT

CROSS-REFERENCE TO RELATED APPLICATION

This application claims priority from and the benefit of Korean Patent Application No. 2010-0120691, filed on Nov. 30, 2010, the disclosure of which is hereby incorporated herein by reference in its entirety.

BACKGROUND

1. Field

The exemplary embodiments relates to technology for a peer-to-peer (P2P) connection between terminals.

2. Discussion of Related Art

Smart phones using wireless networks are being widely used all over the world. Due to the wide use of smart phones, instant messaging and voice over Internet protocol (VoIP) services using mobile networks and Wi-Fi networks are being extended.

Mobile devices such as smart phones mainly have a capability to use a plurality of different types of networks such as a mobile communication data network or a Wi-Fi network. While fees are charged for using the mobile communication data network, Wi-Fi is available at no fee. Accordingly, Wi-Fi is usually preferred in areas where it is available.

However, Wi-Fi does not provide mobility and constant connection to a network. Thus, if a Wi-Fi connection is terminated while a mobile device connected to a network using Wi-Fi is using a P2P service, there is a problem in that the service cannot be provided before reconnecting to a P2P network using other networks.

SUMMARY

The present inventive concept is directed to providing a seamless network connection, even in an abnormal state such as a network disconnection during a P2P connection between devices, in which data transmission through a plurality of networks is possible.

According to an exemplary embodiment, there is provided a P2P connection system including: a user terminal configured to register connection information for connecting to the user terminal through each of a plurality of connectable networks in a location server; and the location server configured to store the connection information received from the user terminal and priority information of the connection information.

According to another exemplary embodiment, there is provided a P2P connection system including: a second user terminal configured to request connection information of a plurality of networks connectable to the first user terminal for a P2P connection to the first user terminal; and a location server configured to provide the connection information to the second user terminal according to the request of the second user terminal, wherein the second user terminal receives the connection information from the location server, and establishes a connection to the first user terminal through an available network having highest priority in the received connection information.

According to still another exemplary embodiment, there is provided a method of registering connection information by a user terminal connectable to a plurality of different types of wireless networks, including: receiving network address translation (NAT) type information of a connected network from a Simple Traversal of User Datagram Protocol (UDP) Through Network Address Translators (STUN) server; registering connection information of the user terminal including the received NAT type information in the location server; and reiterating receiving the NAT type information and registering the connection information in the location server for each of the plurality of connectable networks.

According to yet another exemplary embodiment, there is provided a method of establishing a P2P connection by a second user terminal to a first user terminal, including: requesting a location server to provide connection information of a plurality of networks connectable to the first user terminal; receiving the connection information from the location server; and establishing a connection to an available network having highest connection priority among networks connectable to the first user terminal according to the connection information received from the location server.

BRIEF DESCRIPTION OF THE DRAWINGS

The above and other objects, features and advantages will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the inventive concept will be described in detail below with reference to the accompanying drawings, however, the inventive concept is not limited thereto.

In the following description, well-known technology related to the exemplary embodiments is not described in detail in order to keep the disclosure clear and concise. Terms used herein have been chosen in consideration of functionality of the exemplary embodiments, and may vary depending on a user's or an operator's intentions, or customs in the art. Therefore, the meanings of terms should be interpreted based on the overall context of the present specification.

These exemplary embodiments are provided so that the present disclosure will be thorough and complete and will fully convey the inventive concept to those skilled in the art, and the inventive concept and its equivalents will only be defined by the appended claims.

Figure 1:
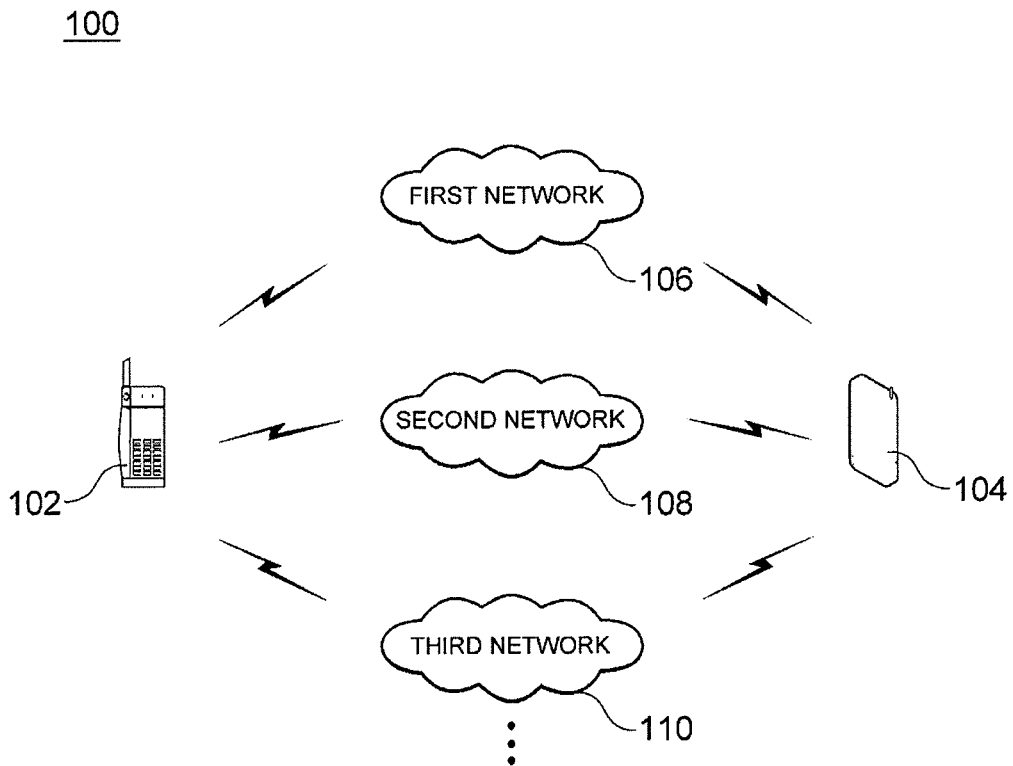
FIG. 1 is a diagram illustrating a P2P connection system 100 according to an exemplary embodiment.

FIG. 1 is a diagram illustrating a P2P connection system 100 according to an exemplary embodiment.

As shown, the P2P connection system 100 according to the exemplary embodiment includes a first user terminal 102 and a second user terminal 104. The first and second user terminals 102 and 104 are connected to each other and exchange data. As described above, the first and second user terminals 102 and 104 may transmit a packet through a wired or wireless network. Examples of the first and second user terminals 102 and 104 include a mobile phone, a smart phone, a tablet personal computer (PC), a personal digital assistant (PDA), a desktop computer, a notebook computer, or the like.

In the exemplary embodiment, the first and second user terminals 102 and 104 are configured to be connectable to a plurality of networks. In the shown exemplary embodiment, the first and second user terminals 102 and 104 are connectable and communicable through a first network 106, a second network 108, and a third network 110. The first and second user terminals 102 and 104 are connected to each other through one network selected by the first and second user terminals 102 and 104 among the first to third networks. Examples of the above-described network may be a Wi-Fi, WiMAX, long term evolution (LTE), CDMA, WCDMA, or GSM, etc.

Figure 2:
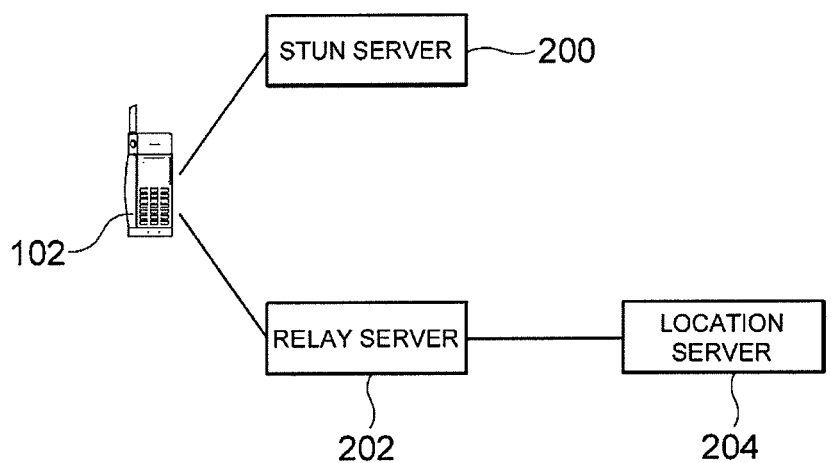
FIG. 2 is a diagram showing a configuration for a first user terminal 102 to register its own connection information in the P2P connection system according to an exemplary embodiment.

FIG. 2 is a diagram showing a configuration for the first user terminal 102 to register its own connection information in the P2P connection system according to an exemplary embodiment. In the following description, it is assumed that, for establishing a connection between the first and second user terminals 102 and 104, the first user terminal 102 registers its own connection information, and the second user terminal 104 connects to the first user terminal 102 using the registered connection information. In another aspect of the exemplary embodiments, the first user terminal 102 may establish a connection to the second user terminal 104 using connection information registered by the second user terminal 104.

As shown, a system in which the first user terminal 102 registers the connection information is configured to include a STUN server 200, a relay server 202, and a location server 204.

The STUN server 200 provides a public address of a client and NAT type information to the client existing within NAT. Here, STUN is an abbreviation of "Simple Traversal of User Datagram Protocol (UDP) Through Network Address Translators" and is defined in RFC 3489. In the exemplary embodiment, the first user terminal 102 requests the STUN server 200 to provide information about an NAT type of a network currently connected to the first user terminal 102, and the STUN server 200 transmits the NAT type information of the network to which the first user terminal 102 belongs to the first user terminal 102 according to the request.

The relay server 202 receives a registration packet including a private address of the first user terminal 102 and NAT type information from the first user terminal 102, and registers connection information of the first user terminal 102 in the location server 204 using the registration packet. At this time, the private address of the first user terminal 102 is a private IP and port information within the NAT of the first user terminal 102. If the registration packet is received from the first user terminal 102, the relay server 202 analyzes the received registration packet, extracts a public address of the first user terminal 102, and transmits the extracted public address, the private address, the NAT type, and an address of the relay server 202 to the location server 204, thereby registering the connection information of the first user terminal 102. The relay server 202 receives the registration packet transmitted from the first user terminal 102 by way of a NAT of a private network to which the first user terminal 102 belongs. At this time, the NAT converts a private address recorded on a header of the registration packet into a public address, and transmits the public address to the relay server 202. Accordingly, the relay server 202 may recognize the public address of the first user terminal 102 by analyzing the packet.

The STUN server 200 and the relay server 202 exist in a public network, and the user terminal 102 is connected to the STUN server 200 located in the public network through all connectable networks, recognizes a NAT type of each network from the STUN server 200, and registers the connection information through the relay server 202. Even when the first user terminal 102 is connected to the same STUN server 200 and relay server 202 existing in the public network as described above, paths in which the user terminal 102 is connected to the above-described servers differ according to the type of currently connected network (Wi-Fi, 3G, or WiMAX network, or the like), so that the STUN server 200 and the relay server 202 recognize that the first user terminal 102 has different private and public addresses according to each network.

Figure 3:
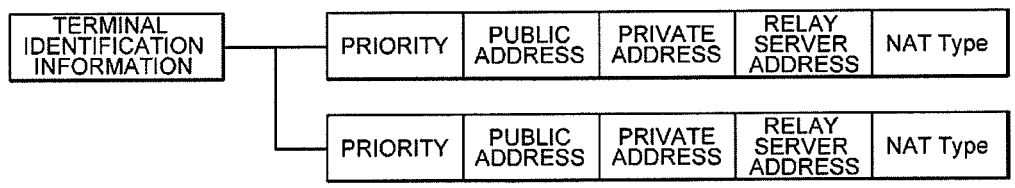
FIG. 3 is a diagram illustrating connection information of the first user terminal 102 stored in a location server 204.

FIG. 3 is a diagram illustrating connection information of the first user terminal 102 stored in the location server 204.

As shown, the location server 204 stores and manages a plurality of connection information for one user terminal. That is, user terminal identification information may be coupled to a plurality of connection information. The connection information includes a public address, a private address, a relay server address, and NAT type information.

In addition, the location server 204 stores a connection priority of the connection information along with the connection information. At this time, the connection priority indicates which connection information is preferred when connecting to the first user terminal 102 and may be set by the first user terminal 102. For example, the first user terminal 102 may also transmit connection priority of a corresponding network when each private address and NAT type information are transmitted to the relay server 202, and the relay server 202 may be configured to transmit the received priority information to the location server 204. For example, when the first user terminal 102 is connectable to each of the Wi-Fi network and the 3G network, the location server 204 stores Wi-Fi connection information and 3G connection information of the first user terminal 102. Because the Wi-Fi network has a high speed and a low cost compared to the 3G network, the first user terminal 102 set a higher priority value to the Wi-Fi connection information than the3G connection information. According to the priority information, the second user terminal 104 first attempts to establish a connection through an available network with the highest priority (the Wi-Fi network) for a P2P connection to the first user terminal 102. If the connection fails or stops, then the second user terminal 104 attempts to establish a connection through the next available network with the highest priority, namely, the 3G network. The priority of connection information can be set by the first user terminal 102, or the location server 204 may determine the connection priority by considering characteristics of each network.

Figure 4:
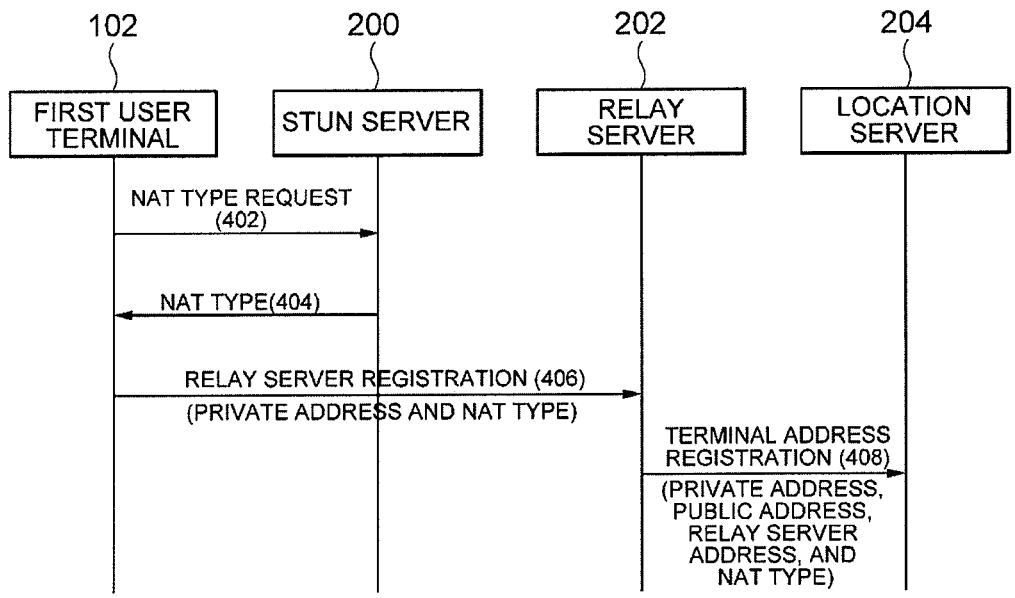
FIG. 4 is a sequence diagram illustrating a connection information registration method 400 of the first user terminal 102 according to an exemplary embodiment.

FIG. 4 is a sequence diagram illustrating a connection information registration method 400 of the first user terminal 102 according to an exemplary embodiment.

First, at step 402, the first user terminal 102 requests NAT type information in a corresponding network by transmitting a STUN test message to the STUN server 200 included in one of connectable wireless networks. Then, at step 404, the STUN server 200 transmits a STUN test result message corresponding to the STUN test message to the first user terminal 102, and the NAT type information is included in the STUN test result message.

At step 406, the first user terminal 102 transmits a registration packet including a private address of the first user terminal 102 and the received NAT type information to the relay server 202. Then, at step 408, the relay server 202 finds a public address (IP address and port number) of the first user terminal 102 by analyzing the registration packet, and transmits the private address and the public address of the first user terminal 102, an address of the relay server 202, and the NAT type information to the location server 204, thereby registering a connection address of the first user terminal 102.

The above-described connection address registration is reiterated for all types of networks connectable to the first user terminal 102, so that the location sever 204 receives connection information directed to the first user terminal 102 for all networks connectable to the first user terminal 102.

Figure 5:
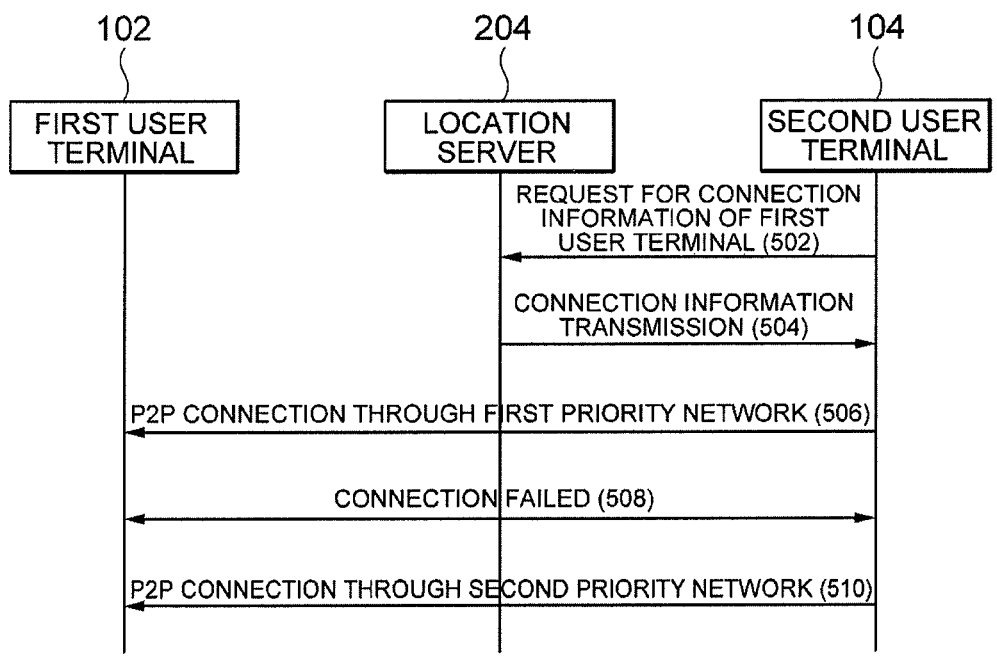
FIG. 5 is a sequence diagram illustrating a P2P connection method 500 according to an exemplary embodiment.

FIG. 5 is a sequence diagram illustrating a P2P connection method 500 according to an exemplary embodiment. As described above, here, it is assumed that the second user terminal 104 attempts to connect to the first user terminal 102 using connection information of the first user terminal 102.

At step 502, the second user terminal 104 requests the location sever 204 to provide connection information of the first user terminal 102 desiring a connection. The connection information includes public addresses, private addresses, relay server addresses, NAT type information, and connection priority information for all networks connectable to the first user terminal 102.

At step 504, connection information of the first user terminal 102 is received from the location sever 204. At step 506, the second user terminal 104 attempts to connect to the first user terminal 102 using connection information having the highest connection priority in the received connection information.

If a connection to the first user terminal 102 fails or abnormally disconnects during data transmission/reception in step 506, at step 508 and 510, the second user terminal 104 establishes a connection to the first user terminal 102 through the next available network having highest connection priority using the connection information received in step 504.

According to the exemplary embodiments, it is possible to ensure maximum connectivity between devices because a connection to a network having the highest priority may be directly established using pre-stored connection information even when a network connection is abnormally disconnected in a P2P connection mode between devices.

An exemplary embodiment may include a recordable medium that has a program code for executing a method of registering connection information and a method of registering P2P connection information. The computer readable recordable medium includes various types of recordable media in which data readable by computer systems can be stored. For example, the computer readable recordable media include a Read Only Memory (ROM), a Random Access Memory (RAM), a Compact Disc (CD)-ROM, a magnetic tape, a floppy disk, an optical data storing apparatus, etc. Also, the computer readable recordable media may be distributed in computer systems connected with each other through a network and a program code which the computer can read by a distributed processing method may be stored and executed therein.

It will be apparent to those skilled in the art that various modifications can be made to the above-described exemplary embodiments without departing from the spirit or scope of the inventive concept. Thus, it is intended that the exemplary embodiments covers all such modifications provided they come within the scope of the appended claims and their equivalents.

What is claimed is:

1. A peer-to-peer (P2P) connection system comprising:
a user terminal configured to receive, from a Simple Traversal of User Datagram Protocol (UDP) Through Network Address Translators (STUN) server, Network Address Translation (NAT) type information for a plurality of connectable networks;
a location server configured to store connection information for connecting the user terminal to a second user terminal using a P2P connection through the plurality of connectable networks; and
a relay server to which the user terminal transmits a registration packet to register the connection information through the relay server, the registration packet comprising the NAT type information and a private address of the user terminal, the connection information comprising a public address of the user terminal, the private address of the user terminal, the NAT type information and an address of the relay server, the relay server being configured to extract the public address of the user terminal from the registration packet and transmit, to the location server, the public address of the user terminal, the private address of the user terminal, the NAT type information and the address of the relay server, thereby registering the connection information in the location server.

2. The P2P connection system of claim 1, the connection information further comprising connection priority information for the plurality of connectable networks.

3. A peer-to-peer (P2P) connection system comprising:
a location server configured to store connection information of a plurality of networks connectable to a first user terminal for a P2P connection to the first user terminal, and to provide the connection information to a second user terminal according to a request of the second user terminal; and
a relay server to which the first user terminal transmits a registration packet to register the connection information through the relay server, the registration packet comprising NAT type information for the plurality of networks and a private address of the first user terminal, the connection information comprising a public address of the first user terminal, the private address of the first user terminal, the NAT type information and an address of the relay server, the relay server being configured to extract the public address of the first user terminal from the registration packet and transmit, to the location server, the public address of the first user terminal, the private address of the first user terminal, the NAT type information and the address of the relay server, thereby registering the connection information in the location server,
wherein the second user terminal uses the connection information to establish the P2P connection to the first user terminal through a first network among the plurality of networks.

4. The P2P connection system of claim 3, the connection information further comprising connection priority information for the plurality of networks, the first network having a highest connection priority among the plurality of networks according to the connection priority information.

5. The P2P connection system of claim 4, wherein when the P2P connection to the first user terminal through the first network is disconnected, the second user terminal uses the connection information to reestablish the P2P connection to the first user terminal through a second network having a next highest connection priority among the plurality of networks according to the connection priority information.

6. A method of registering P2P connection information, comprising:

receiving, by a user terminal, Network Address Translation (NAT) type information from a Simple Traversal of User Datagram Protocol (UDP) Through Network Address Translators (STUN) server for a plurality of connectable networks;

transmitting, by the user terminal, a registration packet to a relay server to register, through the relay server, connection information for connecting the user terminal to a second user terminal using a P2P connection through the plurality of connectable networks, the registration packet comprising the NAT type information and a private address of the user terminal, the connection information comprising a public address of the user terminal, the private address of the user terminal, the NAT type information and an address of the relay server;

extracting, by the relay server, the public address of the user terminal from the registration packet; and transmitting, by the relay server, the extracted public address of the user terminal, the address of the relay server, the private address of the user terminal, and the NAT type information, to a location server, thereby registering the connection information in the location server.

7. The method of claim 6, the connection information further comprising connection priority information for the plurality of connectable networks.

* * * * *